US006753787B2

(12) United States Patent
Cole

(10) Patent No.: US 6,753,787 B2
(45) Date of Patent: Jun. 22, 2004

(54) DUMP TRUCK TAILGATE LATCH MONITOR

(76) Inventor: Floyd Cole, 5619 Broughton St., Norfolk, VA (US) 23502

( * ) Notice: Subject to any disclaimer, the term of this patent is extended or adjusted under 35 U.S.C. 154(b) by 101 days.

(21) Appl. No.: 09/978,245

(22) Filed: Oct. 17, 2001

(65) Prior Publication Data

US 2003/0071722 A1 Apr. 17, 2003

(51) Int. Cl.[7] ............................................. G08B 21/00
(52) U.S. Cl. ..................... 340/686.1; 340/687; 340/457
(58) Field of Search ........................... 340/686.1, 686.6, 340/687, 426.28, 426.29, 457, 468; 298/23 M, 23 MD; 700/81, 82, 122; 180/286; 200/61.44

(56) References Cited

U.S. PATENT DOCUMENTS

| | | | |
|---|---|---|---|
| 1,299,979 A | | 4/1919 | Malburg |
| 2,576,017 A | | 11/1951 | Jeffery et al. |
| 3,697,943 A | | 10/1972 | Andres |
| 3,789,357 A | | 1/1974 | Fritz, Jr. |
| 4,109,963 A | * | 8/1978 | Sieving et al. ............ 298/23 M |
| 4,630,191 A | * | 12/1986 | Strosser ....................... 700/81 |
| 5,656,990 A | | 8/1997 | Schwimmer |
| 6,137,419 A | | 10/2000 | Lennox et al. |

* cited by examiner

Primary Examiner—Van T. Trieu
(74) Attorney, Agent, or Firm—Bradley D. Goldizen

(57) ABSTRACT

The present invention includes a device for alerting the operator of a truck equipped with a dump bed when the tailgate is unsecured. In one embodiment, the device is connected to an existing "low air" alarm that indicates a rapid drop in air pressure in the air hoses of the brakes. Thus, when the tailgate is unsecured, air pressure in the air hoses drops and a warning indicator alerts the operator of the existence of a dangerous condition. The alarm is deactivated by properly securing the tailgate. In another embodiment, an electrical switch connected to the mechanism that secures the tailgate. An alarm signal is provided to the operator when the mechanism is not properly securing the tailgate. The invention also includes a method for bleeding air from the air system that operates brakes of a dump truck to cause the "low air" alarm to be actuated.

7 Claims, 5 Drawing Sheets

DUMP TRUCK TAILGATE LATCH MONITOR

BACKGROUND OF THE INVENTION

Throughout this application, the term "dump truck" is used. This term is to be interpreted broadly and incorporates both dump trucks and dump trailers.

This invention relates to an alarm system for alerting an operator of a dump truck, when the tailgate has been left unsecured. Unlike other types of automobiles such as pickups, dump trucks have tailgates that pivot about an axis located at the top of the tailgate. When an operator desires to dump a load from the bed of his truck, he must raise the front of the bed. As the front of the bed is raised, the load slides rearward and pushes against the tailgate. The weight of the load causes the bottom of the tailgate to be pushed outward and the load then slides from the bed. Most modern dump trucks are equipped with a safety device that must be actuated by the operator of the dump truck to secure the tailgate. In many dump trucks the operator must release the safety device prior to raising the bed of the truck to dump a load.

Dump trucks are used for a variety of hauling tasks in today's society. Roadway and building construction sites require vast amounts of fill materials such as sand, gravel or stone. These fill materials are typically hauled in the beds of dump trucks. Additionally, large chunks of rubble from building demolition sites are hauled to land fills in dump trucks. Dump truck loads can shift in the bed during transport and be inadvertently deposited on a roadway surface if the tailgate is not safely latched. Other roadway hazards may be created when debris from an unsecured dump truck falls onto a roadway. For example, gravel from the dump bed of a dump truck, having an unsecured tailgate, may fall onto a road surface and damage an automobile following the vehicle. Gravel falling from dump truck beds typically damages automobiles following the dump truck by breaking headlights and windshields or damaging radiators. Moreover, an operator of a vehicle may be startled if his windshield is suddenly shattered and wreck the automobile.

Most modern dump trucks are equipped with a latch that secures the tailgate and prevents it from inadvertently opening. However, the latch cannot prevent the tailgate from opening if the operator has not properly latched it. Thus, a portion of the load may fall out of the bed and onto the roadway surface thereby creating a roadway hazard. Individuals in automobiles following the dump truck may be hit by a portion of the load that has fallen from the bed of the truck as mentioned above. Alternatively, it may become necessary for the individuals to deviate from their intended course of travel and thereby cause an accident.

U.S. Pat. No. 6,137,419 to Lennox et al. discloses a pickup truck tailgate monitor. In Lennox, a tailgate monitor in an operator's compartment of a pickup warns the operator if the tailgate is open. A tailgate for a pickup tends to swing to an open position when the tailgate is not secured. Thus, Lennox uses a sensor mounted on the bed to indicate when the tailgate is open. However, the Lennox device cannot be properly used on a dump truck since the tailgate of a dump truck tends to be closed except when the bed is raised.

U.S. Pat. No. 3,789,357 to Fritz, Jr. discloses a safety apparatus for dump trucks. In Fritz, Jr., a safety circuit automatically shuts off the engine of the dump truck when the bed is raised while the tailgate is closed. Another circuit provides a lamp that indicates when the tailgate is opened. However, Fritz, Jr. requires that the bed be raised in order for the tailgate to open. Thus, a load may be deposited in the bed of a dump truck equipped with the Fritz, Jr. device and the lamp may not be lit until a portion of the load has been inadvertently dumped onto a roadway surface.

Neither of these devices can prevent the existence of a dangerous condition such as when the tailgate is in an unsecured closed position. If a dump truck is equipped with either the Lennox or the Fritz, Jr. device, the tailgate may be closed but not secure. Thus, neither Lennox nor Fritz, Jr. contemplates the problem to be solved by the present invention.

BRIEF SUMMARY OF THE INVENTION

The present invention includes a retro-fit kit that may be installed on existing dump trucks to alert an operator of the existence of a dangerous condition. Typically, trucks with dump beds are equipped with braking systems that operate by utilizing air pressure. An air source such as a compressor generates an air pressure that is stored in a bladder or air tank. The air pressure acts in essentially the same manner as fluid in a passenger car's brake system. As the operator of the dump truck depresses the brake pedal, the air pressure causes the brake shoes to contact with rotating parts of the wheels (rotor).

Since air pressure is a necessary component for actuating the brake system of the dump truck, it must be constantly monitored. Many dump trucks are equipped with an audible alarm that emits a sound when the air pressure in the brake system falls below a set threshold. If the air pressure falls below a second threshold or becomes nil, the brake system of the dump truck will "lock up." Thus, the dump truck will not move when the air pressure falls below the second threshold. When the "low air" pressure alarm sounds, the dump truck operator must identify the source of the problem or else risk the possibility of losing control of the dump truck.

Many modern dump trucks are equipped with a safety mechanism comprising a safety catch that secures the tailgate on a dump truck. Typically, the safety catch is actuated with pneumatic piston that operates by air pressure. The air pressure may be either positive or negative depending upon the configuration of the system. Likewise, hydraulic systems may be used to actuate the safety catch. For ease of understanding, the positive air pressure is only discussed herein.

The pneumatic piston comprises an air chamber and a piston arm. As air is forced into one end of the air chamber, the piston arm is extended from the piston. If air is forced into an opposite end of the air chamber, the piston arm is retracted into the piston. A linkage is connected to the piston arm for transferring the movement of the piston arm to cause the safety catch to be engaged and disengaged. Using this system, an operator of a dump truck can disengage the safety catch and raise the dump bed to dump a load without leaving the cab of the dump truck.

In a typical arrangement, the piston receives air from either of two air supply hoses. The first air supply hose is connected to the piston on an end opposite the second air supply hose. When an air source supplies a positive air pressure through the first hose, the piston arm is extended from the piston. This causes the safety catch to be released. When the air source supplies a positive air pressure through the second hose, the piston arm is retracted into the piston. If the dump bed is down the tailgate is closed and the safety catch will be activated as the piston arm is retracted into the piston.

It should be noted that the pneumatic piston might be substituted for a hydraulic one that operates similar to the pneumatic piston explained above. Alternatively, the pneumatic piston may be biased in one direction of operation, i.e. extended or retracted, and operated by an air pressure in the opposite direction.

In one embodiment of the invention, the "low air" warning indicator is used to alert the dump truck operator that the tailgate is not secured.

In another embodiment, an electrical circuit is provided that alerts the dump truck operator of the dangerous condition. In this embodiment, a lamp or buzzer is located in the operator's cab of the truck. A switch is located near the piston arm and is connected on one side (contact) to the lamp or buzzer and on the other side (contact) to a voltage source. The switch is connected via conductors such as stranded wire that may be wrapped around or ran through the frame of the truck. The voltage source may be either an independent voltage source or a source supplied from the truck's electrical system.

It is an object of the invention to provide an alarm that alerts an operator of a dump truck when the tailgate is left unsecured.

It is another object of the invention to provide a method for modifying the existing "low air" alarm in a dump truck to alert an operator when the tailgate has been left unsecured.

It is a further object of the invention to provide an electrically operated alarm for alerting the operator when the tailgate is unsecured.

DETAILED DESCRIPTION OF THE INVENTION

The following is the preferred embodiment or best mode for carrying out the invention. It should be noted that this invention is not limited by the discussion of the preferred embodiment.

Figure 1:
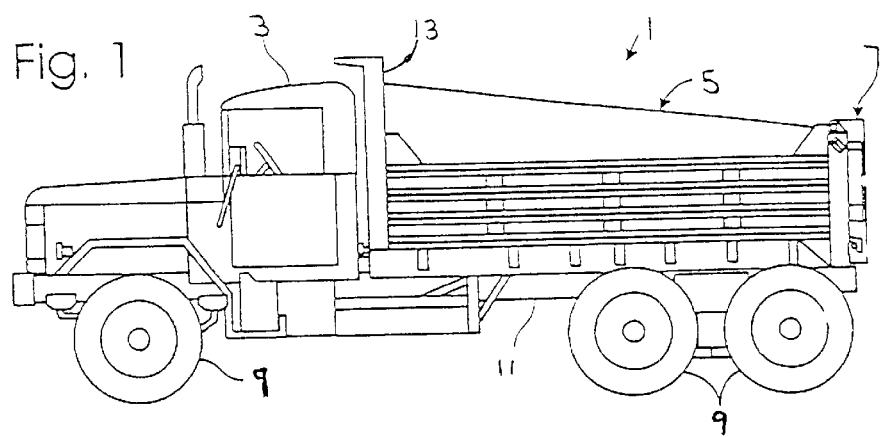
FIG. 1 depicts a dump truck.

FIG. 1 shows a dump truck 1. Dump truck 1 comprises an operator compartment 3 (cab) and a bed 5. Bed 5 is pivotally mounted on frame 11 that is mounted on wheels 9. Bed 5 includes a floor (not shown) and a front wall 13 that is adjacent cab 3. A pair of laterally spaced sidewalls extend rearwardly from front wall 13 to define a rear opening. Dump truck 1 further includes a tailgate 7 that is pivotally mounted on the upper portion of each sidewall. A hydraulic lift system (not shown) is mounted on frame 11 for selectively causing the front portion of bed 5 to be raised at an angle with respect to frame 11, thereby causing bed 5 to be inclined downwardly as it extends toward the rear opening.

Figure 2:
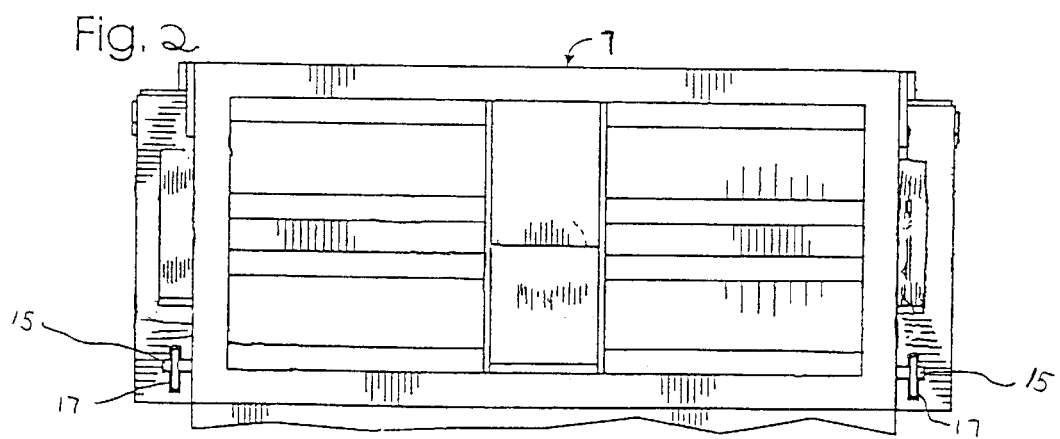
FIG. 2 depicts a tailgate of a dump truck equipped with a safety catch.

FIG. 2 shows tailgate 7. The pivot mechanism for tailgate 7 has not been shown for ease in understanding the invention. Lugs 15 extend from a lower portion of tailgate 7. Catch 17 engages lug 15 on either side of tailgate 7. When catch 17 is properly engaging lug 15, tailgate 7 is secured and thereby prevented from inadvertently opening.

Figure 3A:
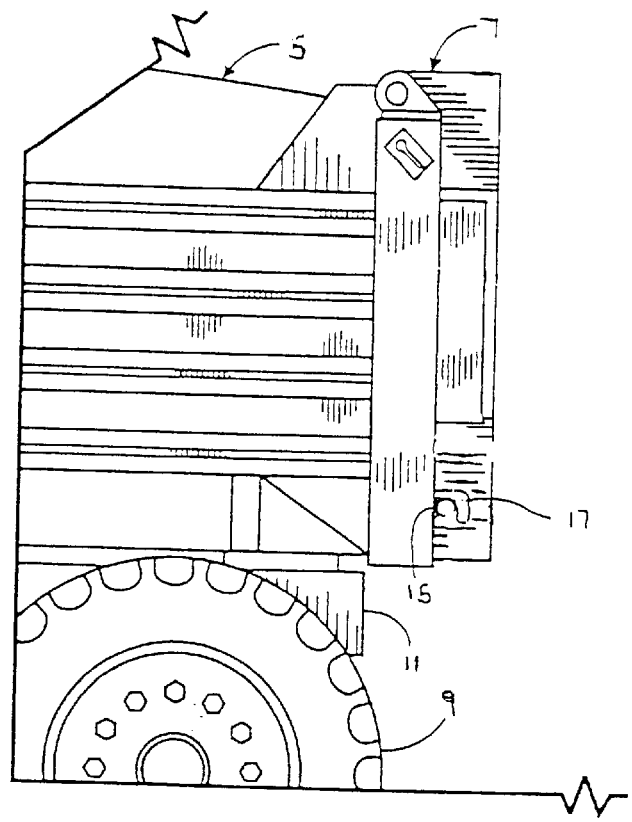
FIG. 3A depicts a side view of a dump truck having the safety catch engaged.
Figure 3B:
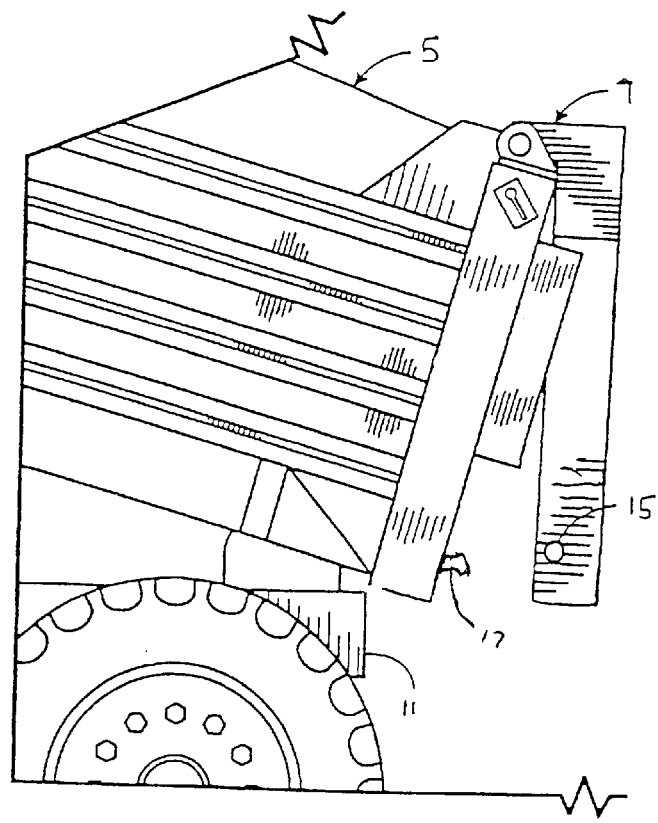
FIG. 3B depicts a side view of a dump truck having the bed raised and the safety catch disengaged.

FIG. 3A shows a side view of tailgate 7 in a closed and secured state. Bed 5 is shown in a lowered state and resting upon frame 11. Lug 15 is engaged by catch 17, thereby preventing tailgate 7 from opening. FIG. 3B depicts bed 5 in a raised state. Catch 17 has been disengaged from lug 15, thereby allowing the bottom portion of tailgate 7 to rotate outward away from the floor of bed 5. FIG. 3B exemplifies dump truck 1 when a load is being dumped from bed 5.

Figure 4:
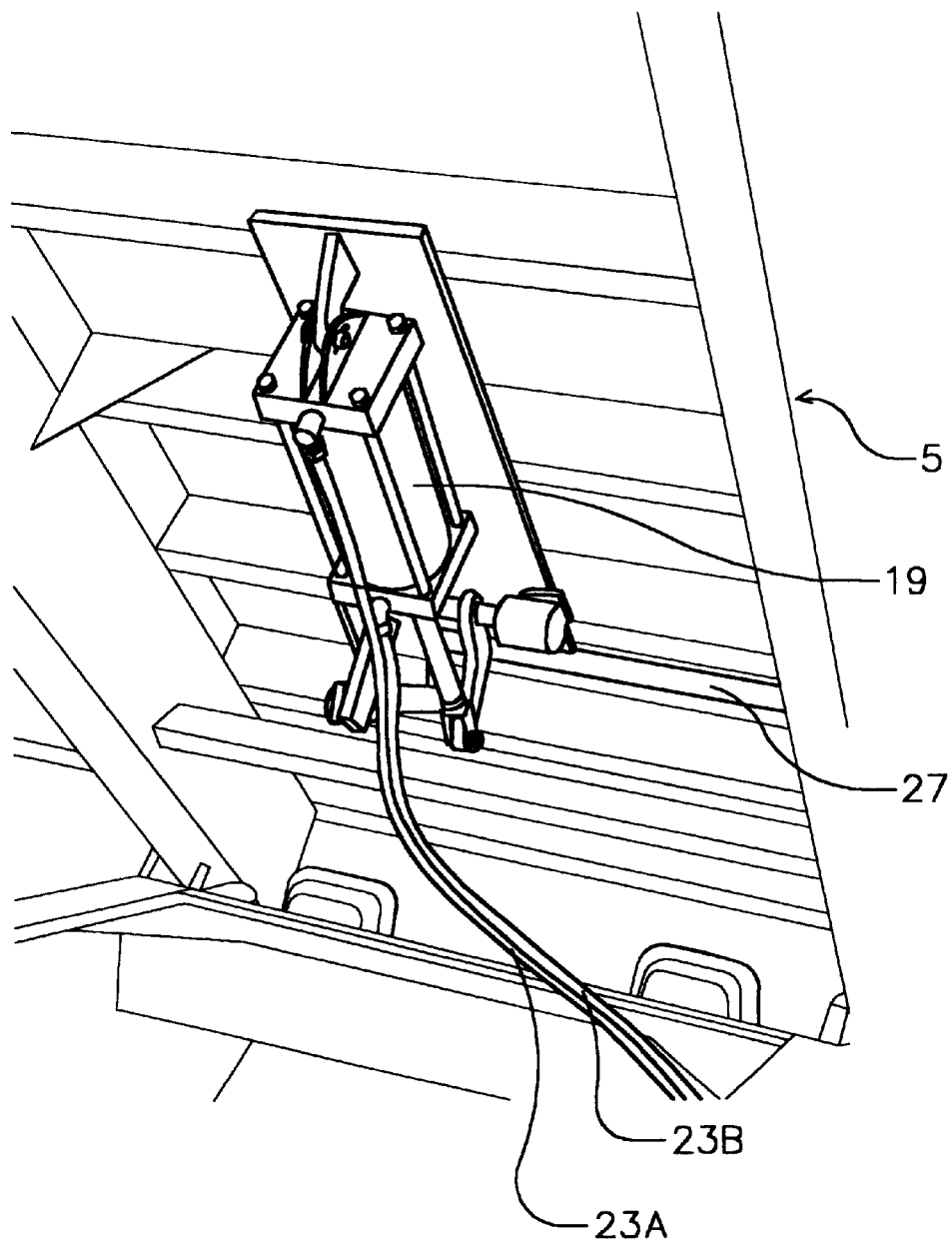
FIG. 4 depicts an air piston that operates a safety catch on a dump truck in the open position.

In FIG. 4, bed 5 is in a raised position for ease in understanding the invention. Ordinarily, catch 17 is disengaged from lug 15 before raising bed 5. Piston 19 is affixed to the underside of bed 5. Two air hoses 23A and 23B connect to piston 19, one at each end. Linkage 27 connects at one end to piston arm 21 and at the other end to catch 17. Air hose 23A, connected to piston 19 at the end opposite piston arm 21, is used to supply air into piston 19 to force piston arm 21 to be extended as shown in FIG. 4. The other air hose 23B, is used to retract piston arm 21 into piston 19.

Figure 5:
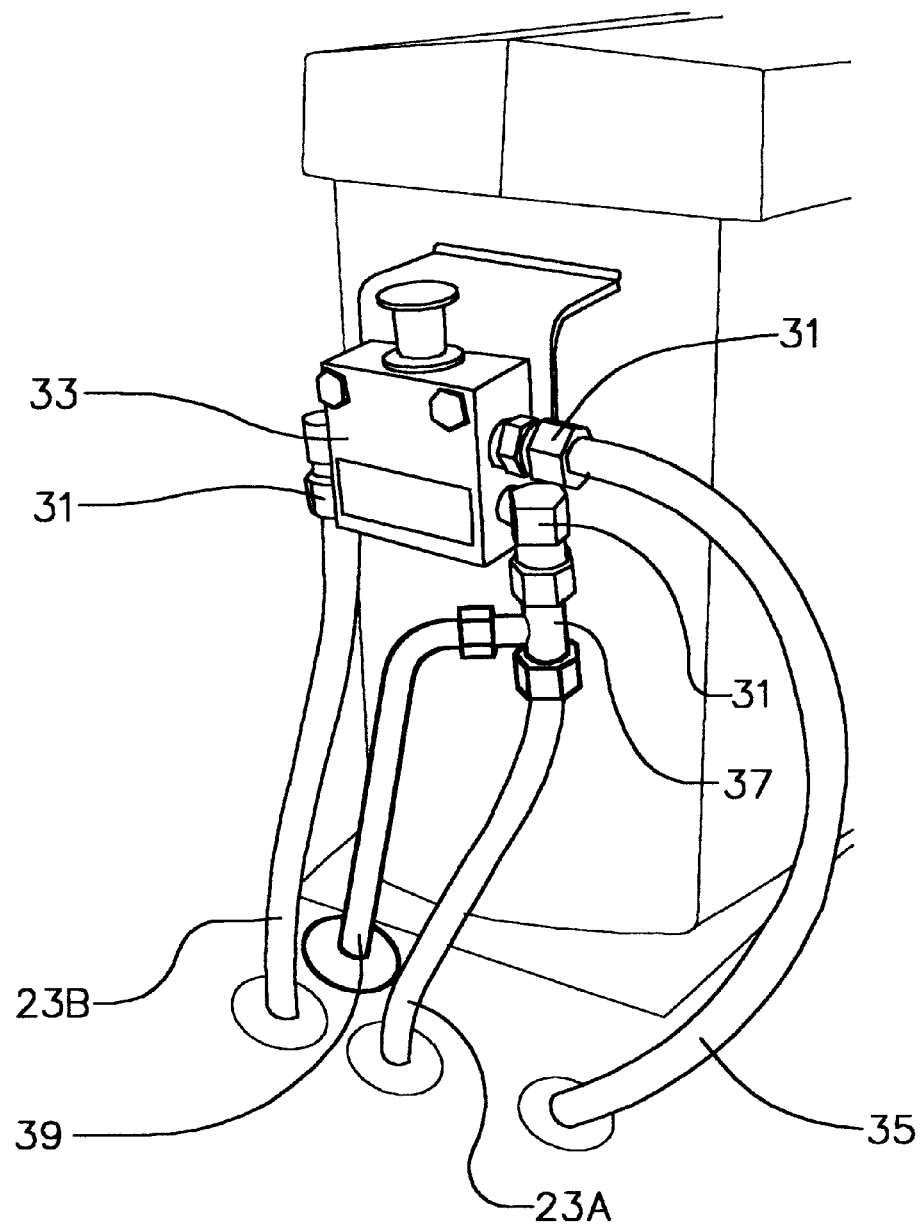
FIG. 5 depicts an operator mechanism for operating the air piston of FIG. 4.

FIG. 5 shows an operator mechanism 29 for operating the air piston of FIG. 4. Operator mechanism 29 comprises air valve 33 for controlling the flow of air into air hoses 23A and 23B. Brass fittings 31 connect the air hoses 23A and 23B to air valve 33. Air supply hose 35 supplies an air source to either hose 23A or 23B. Air hose 23A includes t-shaped connector 37 for bleeding air from hose 23A. When an operator disengages catch 17 from lug 15, air is constantly bled from t-shaped connector 37 through hose 39. This causes the low air warning buzzer to be actuated while catch 17 is disengaged from lug 15. When the operator changes the position of air valve 33 to force air into hose 23B, catch 17 engages lug 15 and the low air warning buzzer automatically shuts off as the air pressure increases above a threshold level. It should be noted that t-shaped connector 37 may be positioned anywhere on hose 23A such that it bleeds air from the air system when catch 17 is disengaged from lug 15.

Figure 6:
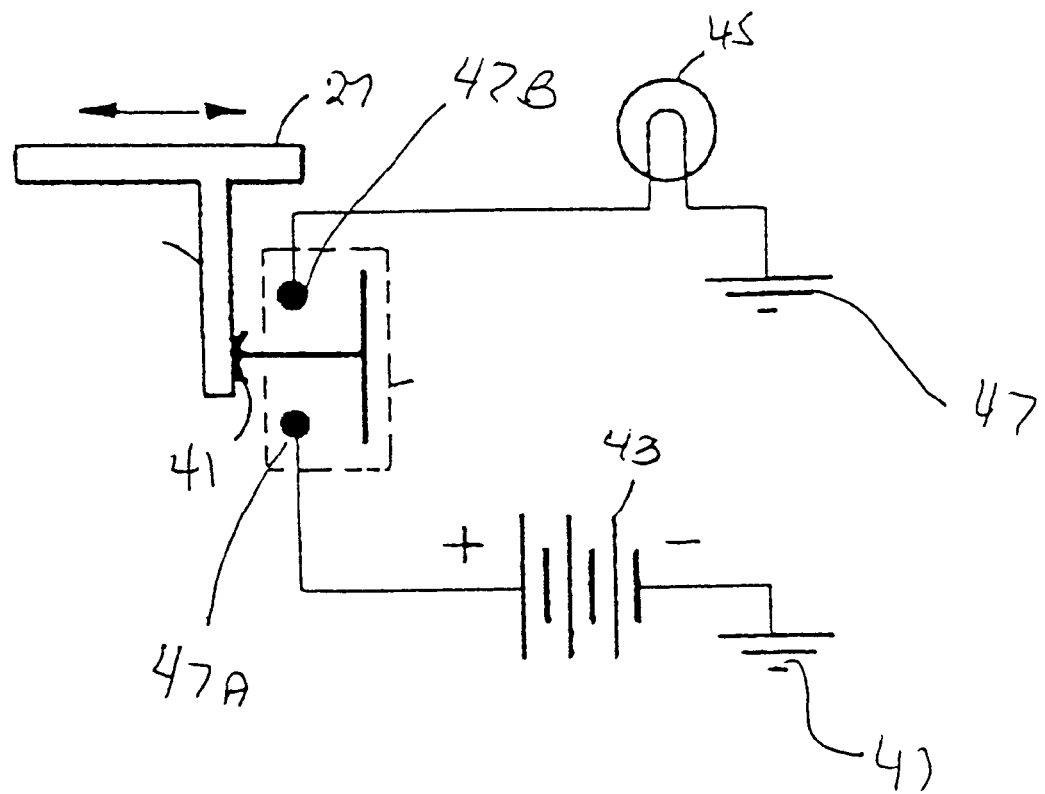
FIG. 6 depicts a schematic for an electrically operated safety alarm.

FIG. 6 depicts an electrical embodiment of the invention. Switch 41 is closed by linkage 27 when catch 17 is disengaged from lug 15. Lamp 45 is located in cab 3 and lit when catch 17 is disengaged from lug 15. Voltage source 43 connects to contact 47A. Lamp 45 connects to contact 47B. When catch 17 engages lug 15, linkage 27 causes switch 41 to close contacts 47A and 47B. An electrical path is created between voltage source 43 and ground 47, thereby allowing current to flow between the two. Lamp 45 becomes lit. It should be noted that various other arrangements of electrical components might be configured to implement this embodiment. Thus, this embodiment of the invention is not limited by this method of implementing the invention. Moreover, It is to be understood that the invention is not limited to the exact construction illustrated and described above. Various changes and modifications may be made without departing from the spirit and the scope of the invention as defined in the following claims.

I claim:

1. An unsecured tailgate alarm, comprising:
    means for detecting whether a latching mechanism is engaging a lug on a tailgate; and
    means for alerting an operator of a vehicle having a dump bed when the tailgate is unsecured.

2. The unsecured tailgate alarm of claim 1, wherein said means for detecting whether a latching mechanism is engaging the lug on the tailgate comprises a switch for causing a lamp to be lit.

3. An unsecured tailgate alarm, comprising:

means for detecting whether a latching mechanism is engaging a lug on a tailgate; and means for alerting an operator of a vehicle having a dump bed when the tailgate is unsecured, wherein said means for detecting whether a latching mechanism is engaging the lug on the tailgate comprises a means for releasing air to actuate a warning buzzer.

4. The unsecured tailgate alarm of claim 3 wherein said means for releasing air is a t-shaped connector.

5. An unsecured tailgate alarm, comprising:

an air source for supplying pressurized air;

a pneumatic piston comprising a piston arm;

an air valve for routing air through said pneumatic piston to extend or retract a piston arm;

a first air hose connected between the air valve and the air source;

a second air hose connected between the air valve and the pneumatic piston for supplying air to cause the piston arm to be extended;

a third air hose connected between the air valve and the pneumatic piston for supplying air to cause the piston arm to be retracted;

a means for releasing air from said second air hose to actuate a low air warning alarm;

a safety latch for securing a tailgate of the dump truck; and, linkage connected between a piston arm and a safety latch for translating movement of the piston arm to the safety latch.

6. A method of detecting whether a tailgate on a dump truck is secured, comprising:

releasing a safety latch that secures a tailgate; and, releasing air from an air system to actuate a low air warning alarm.

7. The method of claim 6 further comprising:

Engaging said safety latch that secures the tailgate thereby preventing air to be released from the air system.

* * * * *